United States Patent
Awadallah et al.

(10) Patent No.: US 7,127,414 B1
(45) Date of Patent: Oct. 24, 2006

(54) METHODS AND COMPUTER-READABLE MEDIA FOR PROCESSING WEB-BASED NEW AND USED GOOD COMPARISON SHOPPING

(76) Inventors: Amr A. Awadallah, 90 D. Escondido Village, Stanford, CA (US) 94305; Thai Tran, 243 Rinconada Ave., Palo Alto, CA (US) 94301

( * ) Notice: Subject to any disclaimer, the term of this patent is extended or adjusted under 35 U.S.C. 154(b) by 0 days.

(21) Appl. No.: 09/419,704

(22) Filed: Oct. 14, 1999

(51) Int. Cl.
*G06Q 30/00* (2006.01)
(52) U.S. Cl. ....................................................... 705/26
(58) Field of Classification Search ................. 705/26, 705/27, 7, 80, 10; 707/3, 10; 700/91; 757/3
See application file for complete search history.

(56) References Cited

U.S. PATENT DOCUMENTS

| | | | |
|---|---|---|---|
| 4,992,940 A * | 2/1991 | Dworkin ....................... 705/26 |
| 5,283,731 A * | 2/1994 | Lalonde et al. ........ 379/100.11 |
| 5,710,887 A * | 1/1998 | Chelliah et al. ............. 345/835 |
| 5,745,882 A * | 4/1998 | Bixler et al. ................ 379/67.1 |
| 5,832,497 A * | 11/1998 | Taylor ........................... 705/1 |
| 5,897,622 A * | 4/1999 | Blinn et al. .................... 705/26 |
| 5,960,407 A * | 9/1999 | Vivona ........................... 705/1 |
| 5,966,697 A * | 10/1999 | Fergerson et al. ............. 705/26 |
| 5,995,976 A * | 11/1999 | Walker et al. ................ 707/104 |
| 5,996,006 A * | 11/1999 | Speicher ........................ 705/1 |
| 6,009,413 A * | 12/1999 | Webber et al. ................. 705/26 |
| 6,070,149 A * | 5/2000 | Tavor et al. .................... 705/26 |
| 6,125,352 A * | 9/2000 | Franklin et al. ............... 705/26 |
| 6,198,977 B1 * | 3/2001 | Bixler et al. ................. 345/716 |
| 6,253,188 B1 * | 6/2001 | Witek et al. .................... 705/1 |
| 6,266,649 B1 * | 7/2001 | Linden et al. ................. 705/14 |
| 6,278,993 B1 * | 8/2001 | Kumar et al. ................... 707/3 |
| 6,334,109 B1 * | 12/2001 | Kanevsky et al. ............. 705/14 |
| 6,519,584 B1 * | 2/2003 | Tognazzini et al. ............ 707/3 |

FOREIGN PATENT DOCUMENTS

JP     407179081 A    *    7/1995

OTHER PUBLICATIONS

"mySimon Launches Next-Generation Web-Shopping Engine Offering Instant E-Commerce Shopping Channel for Portals," PR Newswire (Oct. 26, 1998).*

(Continued)

*Primary Examiner*—Jeffrey A. Smith
(74) *Attorney, Agent, or Firm*—Brinks Hofer Gilson & Lione

(57) ABSTRACT

Methods for generating comparison shopping data are provided. One example method includes receiving a request for a desired item and generating an item table for the desired item. The item table is assembled from current on-line data that includes e-commerce purchasing information. Once the item table is assembled, the item table is displayed for the requested item such that the displayed information can inform an on-line buyer of the best current purchasing alternatives for the requested item. In one aspect of this method, the desired item can be selected form a data base of classified advertising. Once the classified advertising item is selected, the item table is generated and displayed along with the selected classified advertising item. In one example, the item table can include merchant name information, price information, availability information, new and used information, tax and shipping information, prior purchaser ratings, and total cost information. The displayed information will therefore provide an on-line purchaser with a powerful array of information to enable the making of an intelligent on-line purchasing decision.

27 Claims, 8 Drawing Sheets

OTHER PUBLICATIONS

"DealTime.com and BizRate.com Announce Agreement," Business Wire (Sep. 27, 1999).*

"Yahoo! Autos Provides Enhanced Road Map for Researching, Buying and Selling Cars Online," PR Newswire (Oct. 13, 1998).*

"What Car?: Autohunter & What Car? drive ahead with new alliance," M2 Presswire (May 12, 1999).*

"Yahoo! Makes Car Buying Easier With New Online Car-Buing Merchant Program," PR Newswire (Dec. 8, 1997).*

"PowerAdz Offers Consumers 200,000+ 'Fresh' Online Classifieds; Current Ads from Over 800 Newspaper Affiliates Ensures Reliability," Business Wire (Sep. 14, 1999).*

"NY PowerAdz.com: PowerAdz.com Launches AdQuest3d Internet Classifieds with 600+ Newspaper Affiliates," Business Wire (Jan. 28, 1999).*

"INSWEB Excite: Excite, Inc. To Feature InsWeb's Auto Quoting Capabilities; InsWeb Expands Its Reach By Providing One-Stop Insurance Shopping For Excite and WebCrawler Users," Business Wire (Nov. 18, 1997).*

"Shopping Robots For Electronic Commerce," Online, vol. 22, No. 4 (Jul.-Aug. 1998) p. 14.*

"Digital City announce new interactive classified advertising solution for newspapers," Business Wire (Nov. 25, 1996).*

"Buy, Bid or Bargain? Excite Offers Integrated Internet Shopping Search to Give Users Powerful Web Shopping Opportunities," PR Newswire, (Jul. 21, 1998).*

"Lycos and AdOne's ClassifiedWarehouse.com Create Online Alliance; The Web's Most Comprehensive Classified Listings Come to Lycos.com," Business Wire, (Dec. 2, 1998) p. 1093.*

"PowerAdz Offers Consumers 200,000+ 'Fresh' Online Classifieds; Current Ads from Over 800 Newspater Affiliates Ensure Reliability" Business Wire (Sep. 14, 1999).*

Roth, Deborah: "Long live online shopping!—Stanford pair founds vivasmart.com, e-commerce site for college students"; Stanford Daily; May 13, 1999.*

* cited by examiner

VivaSmart
YOUR COMMUNITY MARKETPLACE

STANFORD UNIVERSITY
OTHER MARKETPLACES

CAMPUS HOME (CONSUMER ELECTRONICS) PDA'S

SEARCH FOR ITEM: [ ] [SEARCH] [ENTIRE MARKETPLACE ▽]

[ ] INCLUDE ENTIRE TEXT OF CLASSIFIED ADS IN SEARCH

POST A CLASSIFIED AD

NOTIFY ME WHEN AN AD APPEARS

HELLO ASA@CS.STANFORD.EDU | LOGOUT

ITEMS 1 TO 20 OF 25    PREV | NEXT

| ALL ADS | FOR SALE | WANT TO BUY | MERCHANTS | | |
|---|---|---|---|---|---|
| SORT BY TYPE | SORT BY TITLE | | SORT BY NAME | SORT BY DATE | SORT BY PRICE |
| WTB | WTB: PALM III CLEAR CASE | | ALEXIS DANG | 09-JUN-99 | |
| WTB | WTB: PALM IIIx | | ALAN DANG | 06-JUN-99 | |
| FS | FS: PALM III + COACH CARRYING CASE | | PAUL CHANG | 06-JUN-99 | $175.00 |
| FS | FS: PALM PILOT WITH 2MB IR PALM OS 3 UPGRADE (LIKE PALM III) FOR $170 | | BOBBY C LEE | 29-MAY-99 | $170.00 |
| FS | FS: PALM PILOT PRO | | SCOTT WANG | 24-MAY-99 | $100.00 |
| FS | RE: FS: PALM V AND PALM III | | CHRISTOPHER S HONG | 15-MAY-99 | $380.00 |
| FS | FS: PALM V AND PALM III | | CHRISTOPHER S HONG | 13-MAY-99 | $380.00 |

Fig. 2A

ON-THE-FLY GENERATION OF ITEM TABLE

ITEM A

| MERCHANT | PRICE | AVAILABILITY | TYPE | TAX & SHIP | TOTAL PRICE | BUY |
|---|---|---|---|---|---|---|
| MERCHANT-1 | $ | 2-3 WEEKS | NEW | $ | $ | BUY |
| MERCHANT-2 | $ | OUT OF STOCK | NEW | $ | $ | |
| MERCHANT-3 | $ | NOT CARRIED | N/A | $ | $ | |
| ... | | ... | | | | ... |
| MERCHANT-N | $ | 1-2 DAYS | USED | $ | $ | BUY |

LIST 482

METHODS AND COMPUTER-READABLE MEDIA FOR PROCESSING WEB-BASED NEW AND USED GOOD COMPARISON SHOPPING

BACKGROUND OF THE INVENTION

1. Field of the Invention

This invention relates generally to computer systems, and more particularly to methods for facilitating informed Internet commerce transactions.

2. Description of the Related Art

As a result of the Internet's popularity and the recent mechanisms for ensuring secure transactions of confidential data, merchants are increasingly turning to the Internet to reach a world-wide customer base. On the same token, consumers are also increasingly turning to the Internet to research and purchase all types of goods and services.

Typically, merchants set up their own web sites that are specifically designed to market their particular goods or services. Some web sites even allow consumers to comparison shop particular goods or services. Comparison shopping, however, is limited to new merchandise or services. This allows one merchant to competitively market its merchandise against merchandise of like kind.

Another type of Internet commerce is in the form of classified advertising. To facilitate this type of classified advertising, web sites are designed to allow users to list their goods or services, and users that may be interested in purchasing the goods or services can contact the listing party directly, typically by way of e-mail. This type of classified advertising is limited to used merchandise or services.

In view of the foregoing, there is a need for more comprehensive and informative web-based comparison shopping methods, which use data of both new and used goods, and services. There is also a need for informative comparison shopping methods that enable users to quickly generate comparison price lists of on-line merchants, off-line merchants, and private party classified ad sellers.

SUMMARY OF THE INVENTION

Broadly speaking, the present invention fills these needs by providing methods and computer readable media for enabling the generation of comprehensive web-based comparison shopping data. It should be appreciated that the present invention can be implemented in numerous ways, including as a process, an apparatus, a system, computer readable media, or a device. Several inventive embodiments of the present invention are described below.

In one embodiment, a method for generating comparison shopping data is disclosed. The method includes generating a database of classified advertising, such that the database of classified advertising has a plurality of items. A database of items is also generated, and each item has a list of merchants and prices. Each merchant has an associated price for the item. The method further includes receiving a request for a desired item from the database of classified advertising and associating the desired item with an item from the database of items. The requested item from the database of classified advertising is then displayed along with a particular list of merchants and prices. The particular list of merchants and prices are part of the database of items. In one aspect of this embodiment, the generating of the database of items can be performed in real-time over the Internet upon receiving the request for the desired item from the database of classified advertising.

In another embodiment, a method for generating web-based comparison shopping data is disclosed. The method includes receiving a request for a desired item from a database of classified advertising. After the request is received, an item table is generated for the desired item. The item table is assembled from current on-line data. The method then includes the association of the desired item from the database of classified advertising with the item table. Once associated, the method proceeds to display the requested item from the database of classified advertising along with the generated item table. In one aspect of this embodiment, the item table includes price information, availability information, type information, additional cost information, and total cost information.

In yet another embodiment, a method for generating web-based comparison shopping data is disclosed. The method includes generating a database of classified advertising, such that the database of classified advertising has a plurality of items. A database of items is generated, and each item has a list of merchants and prices. Each merchant preferably has an associated price for the item. A request for a desired item from the database of classified advertising is then received. The desired item is searched from the database of items, and the searching can be performed by way of a key word search or a browsing search. The method then follows to associate the desired item with the item from the database of items, and to display the requested item from the database of classified advertising along with a particular list of merchants and prices. The particular list of merchants and prices is part of the database of items.

In another embodiment, a method for generating comparison shopping data is disclosed. The method includes: (a) receiving a request for a desired item; (b) generating an item table for the desired item, such that the item table is assembled from current on-line data that includes e-commerce purchasing information; and (c) displaying the requested item in the form of the generated item table, such that the displaying is configured to inform an on-line buyer of purchasing alternatives for the requested item. Preferably, the table item includes one or more of merchant information, price information, availability information, new and used information, tax and shipping information, and total cost information.

In another embodiment, a computer readable media having program instructions for generating web-based comparison shopping data is disclosed. The computer readable media includes program instructions for generating a database of classified advertising, such that the database of classified advertising has a plurality of items. Program instructions are also provided to generate a database of items, and each item has a list of merchants and prices. Each merchant preferably has an associated price for the item. Program instructions are configured to form a request for a desired item from the database of classified advertising. Program instructions then search for the desired item in the database of items, and the searching can be performed by way of a key word search or a browsing search. The program instructions then follow to associate the desired item with the item from the database of items, and to display the requested item from the database of classified advertising along with a particular list of merchants and prices. The particular list of merchants and prices is part of the database of items.

In still another embodiment, a method for generating comparison shopping data is disclosed. The comparison shopping data is generated from a database of classified advertising having a plurality of items and on-line merchant items, each item of the on-line merchant items having a list of merchants and prices, and each merchant has an associated price for the item. The method includes: (a) receiving a request for a desired item from the database of classified advertising; (b) associating the desired item with an item from the on-line merchant items; and (c) displaying the requested item from the database of classified advertising along with a particular list of merchants and prices, the particular list of merchants and prices being part of the on-line merchant items. In this embodiment, the associating of the desired item with the item from the on-line merchant items further includes: (i) identifying the desired item by running a description of the desired item in the database of classified advertising through a classification rule base, such that the running through the classification rule base defines a class for the desired item; and (ii) searching the on-line merchant items to find the class that corresponds to the desired item.

Advantageously, the methods of the present invention provide users of an e-commerce web site the ability to quickly search for a desired item from a classified advertising site, select the desired item, and then be presented with the desired classified item and a list of merchants that offer the same item. The price each merchant is offering the item for is also presented so that the user can comparison shop not only between the price of a classified advertisement and a merchant price, but also between a set of merchants offering the same item. Other information, such as, availability information, =new and used information, tax and shipping information, total cost information, and user ratings (i.e., signifying a users satisfaction with a particular merchant) can also be provided. As a result, users of an e-commerce site that implements methods in accordance with the embodiments of the present invention can be assured that they are getting the best possible price and service for a desired item. This type of comprehensive comparison shopping capability also has the benefit of reducing a shopper's stress and the amount of time that may be associated with repetitively searching numerous Internet sites in an effort to obtain a good price.

Another advantage is that the items that are the subject of e-commerce can be any type of item or service. In one specific example described below, an item can be a book that is generally purchased by a member of the community. As is well known, books are easily identified using ISBN identifiers, and therefore, the merchant carrying that book can be easily identified and added to the item database. Once added to the item database, the user can search the list of merchants and comparison shop for the best price, while still considering the book items provided by way of the classified advertising database. Accordingly, it should be understood that the methods of the present invention can be applied to any type of item and to any type of community.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2A shows a graphical user interface, in accordance with one embodiment of the present invention.

FIG. 4C illustrates an item table, which is configured to be generated in real-time over the Internet upon receiving a request for a desired item, in accordance with another embodiment of the present invention.

DETAILED DESCRIPTION OF THE PREFERRED EMBODIMENTS

An invention is described for methods and computer readable media for enabling the generation and display of comprehensive web-based comparison shopping data. It will be obvious, however, to one skilled in the art, that the present invention may be practiced without some or all of these specific details. In other instances, well known process operations have not been described in detail in order not to unnecessarily obscure the present invention.

Figure 1:
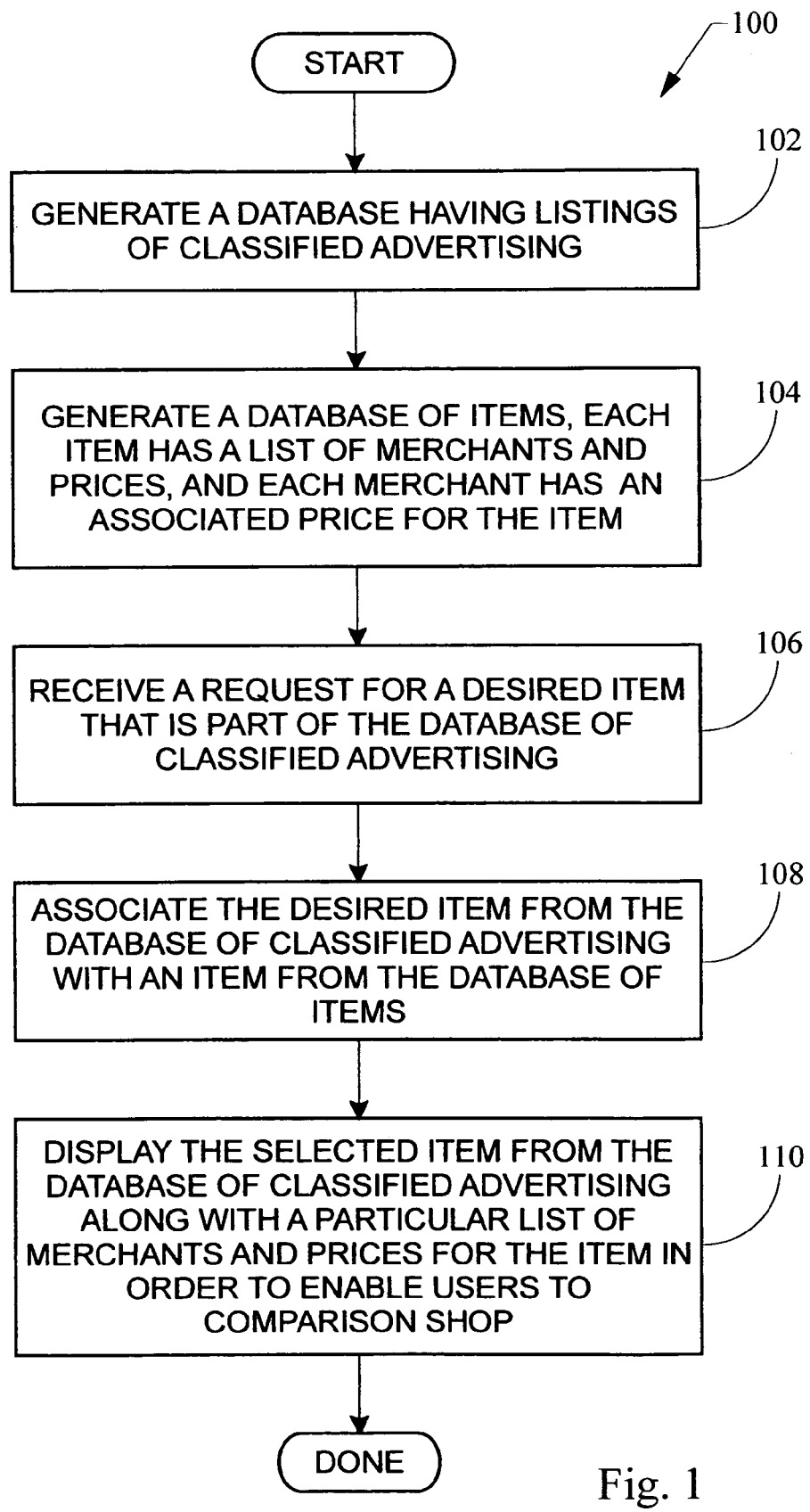
FIG. 1 illustrates a flowchart diagram that generally describes the method operations of one embodiment of the present invention.

FIG. 1 illustrates a flowchart diagram 100, in accordance with one embodiment of the present invention. The flowchart describes the method operations performed in generating intelligent comparison shopping data that can be used to make informed choices in e-commerce transactions, which may be facilitated by way of a web site interface or portal. In general, the web site interface is preferably a community marketplace interface, which may be used by a given member of a community to gain access to intelligently presented e-commerce data. Although specific examples will be provided with reference to a college-type community marketplace, it should be understood that the methods and computer readable media of the present invention apply to any type of web-based community. Examples of communities may include, company-specific communities, special organization or group communities, non-profit communities, or any other type of community that may benefit from the generation of intelligently processed data to facilitate e-commerce transactions.

The method of FIG. 1 begins at an operation 102 where a database having listings of classified advertising is generated. By way of example, a community marketplace can include listings for a variety of goods and services. The classified advertising database is typically generated in response to submissions for listings in the classified advertising database. In this embodiment, the classified advertising database may be generated by members of a particular community marketplace which desire to sell goods and services by way of the community marketplace. Once the database for the classified advertising is generated in operation 102, the method will proceed to an operation 104. In operation 104, a database of items is generated, and each item has a list of merchants and prices. In this embodiment, each merchant will have an associated price for the item.

Furthermore, each item in the database of items will preferably correspond to an item that is part of the database of classified advertising. For example, if a member of the community marketplace wants to sell a video cassette recorder (VCR), the marketplace member will place the VCR for sale by way of the classified advertising database. The list of merchants and prices for each item in the database of items can be generated either on-the-fly (i.e., while the user is on-line), or can be generated in advance and placed into the database of items. If the list of merchants and prices is generated in advance, the method will ensure that the list of merchants and prices is periodically updated in order to account for the most current prices and merchants carrying that item.

Once the database of items has been generated in operation 104, the method will proceed to an operation 106 where a request for a desired item that is part of the database of classified advertising is received. In general, the request for a desired item is made by a user who can access to the database of classified advertising in the community marketplace and then locate a desired item. As will be described in greater detail below, the user can locate the desired item by performing a search through the database of classified advertising for a particular type of item, or browsing through the list of classified ads for the particular type of item(s).

After the user locates the desired item, the user can select that item and the request will be made for that particular item. The desired item from the database of classified advertising is then associated with an item from the database of items. To begin the association, once the item is selected, a summary description and detailed description for the selected classified ad is run through a classification rule base which identifies the item type. For example, a summary description of "Old VCR for sale," will identify the selected item as a "VCR" class. As mentioned above, the database of items will include a list of merchants and prices for that item. To complete the association operation, once the class (i.e., VCR) of the item is identified, a search of descriptions of items offered by on-line merchants within the identified class is performed. In general, the search can be made from Internet-based on-line items after the request is from the aforementioned database of items. Once the association has occurred in operation 108, the method proceeds to an operation 110 where the selected item from the database of classified advertising is displayed along with a particular list of merchants and prices for the item in order to enable the user to comparison shop. An example of the display presented to the user is illustrated in FIG. 4B below.

FIG. 2A shows a graphical user interface 200, in accordance with one embodiment of the present invention. In the graphical user interface 200, a community marketplace is provided for a user. The community marketplace, in this example, is for Stanford University. As mentioned above, the community marketplace can be for any other type of community, and does not necessarily have to be for a college community. In this example, the user who initially visited the community marketplace for Stanford University from a campus homepage 202 can select a link 204 for consumer electronics. From the page that is displayed for consumer electronics, the user can select personal digital assistants (PDAs).

Once PDAs are selected, the user is presented with the graphical user interface 200. In this example, all ads 212 are selected, and a list of all of the advertisements in the database of classified advertising for PDAs 206 are displayed. The member of the community marketplace can then scroll down the listings of advertisements and select a desired item. In this example, the member selects classified ad 214. In this display, each of the classified ads can be sorted by type, title, name, date, and price. In this example, the user selected to sort by date. The desired classified ad 214 is for a palm pilot with 2 MB IR palm OS, and is listed for a price of $170.00.

Figure 2B:
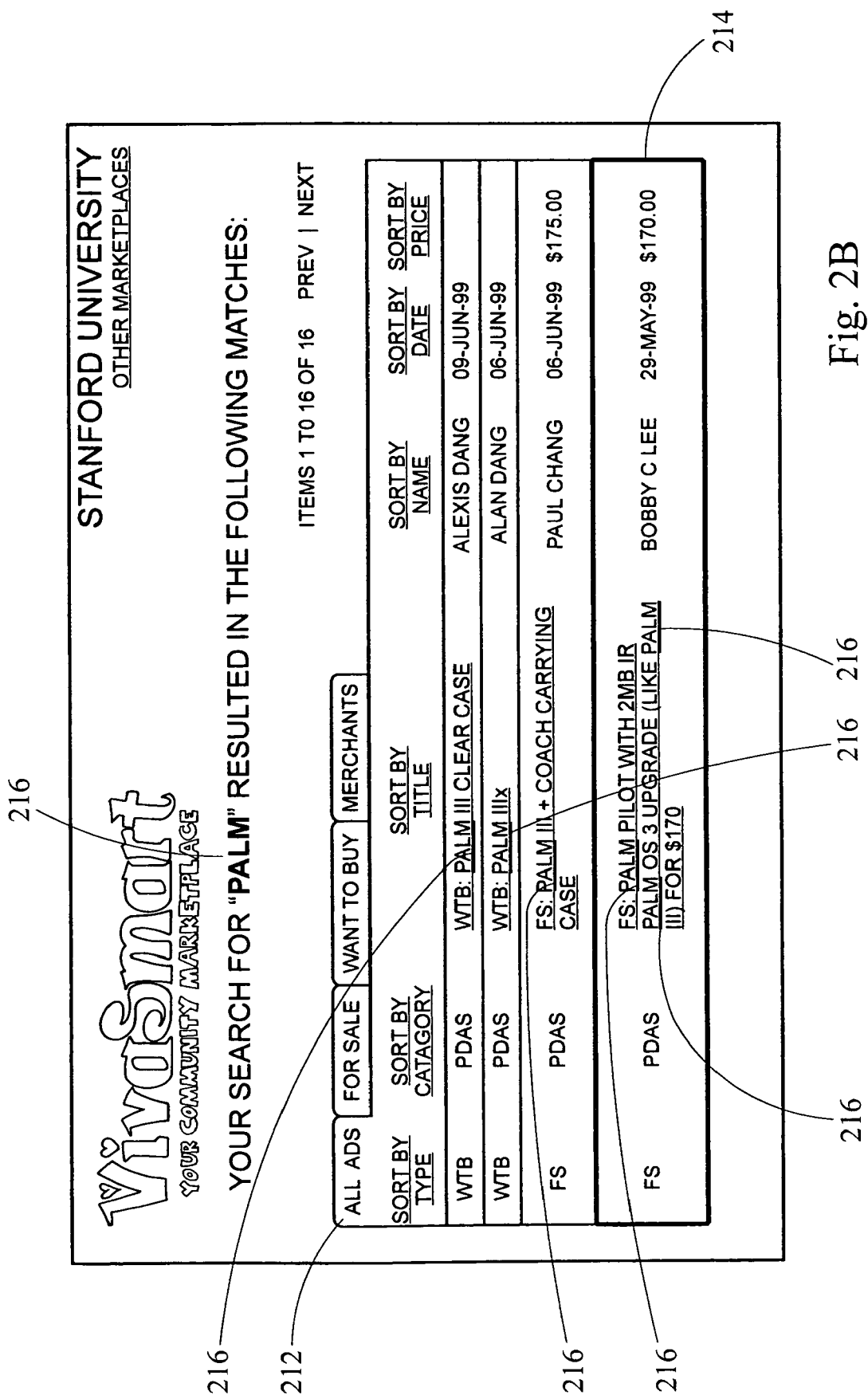
FIG. 2B illustrates the classified advertising database in the case where the user desires to search for an item, in accordance with one embodiment of the present invention.

FIG. 2B illustrates the classified advertising database in the case where the user desires to search for the word "palm" 216. Item 216 is then highlighted for the user in the listing of advertisements provided by the database of classified ads. By way of the searching technique, the user can then select classified ad 214.

Figure 3:
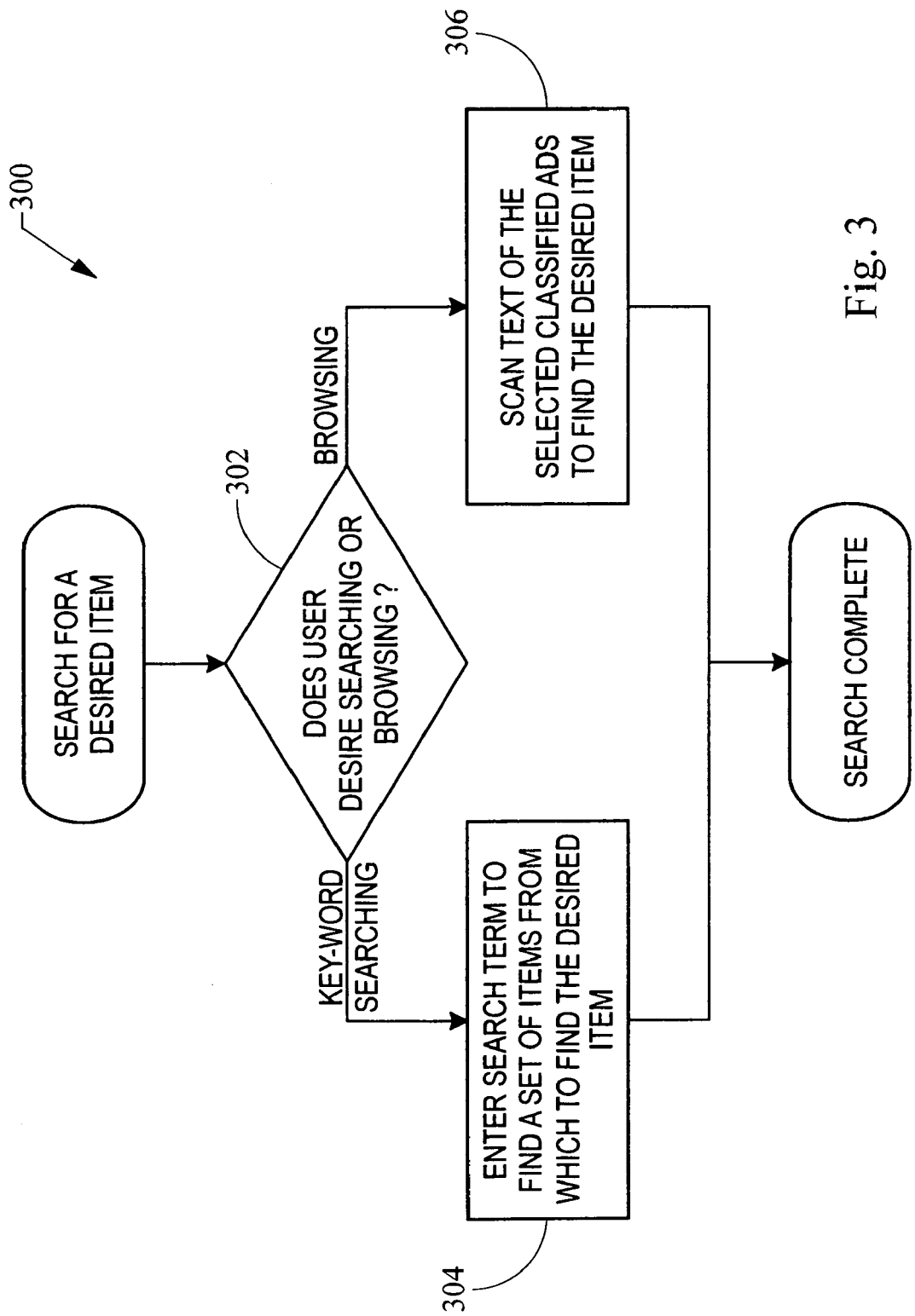
FIG. 3 illustrates a more detailed flowchart diagram of a method where the user determines and selects how to search for a desired item through the database of classified advertising.

FIG. 3 illustrates a more detailed flowchart diagram of a method 300 where the user determines and selects how to search for a desired item through the database of classified advertising. The method starts at decision operation 302 where it is determined whether the user wants to search or browse to identify the desired item. If searching is desired, key-word searching is performed and the method proceeds to operation 304 where the user can enter a search term to find a set of ads from which to find the desired item. On the other hand, if the user desires to browse for the desired item, the method will proceed to operation 306 where the user can scan text of the selected classified ads to find the desired item. Once the desired item has been selected, the search will be complete.

Figure 4A:
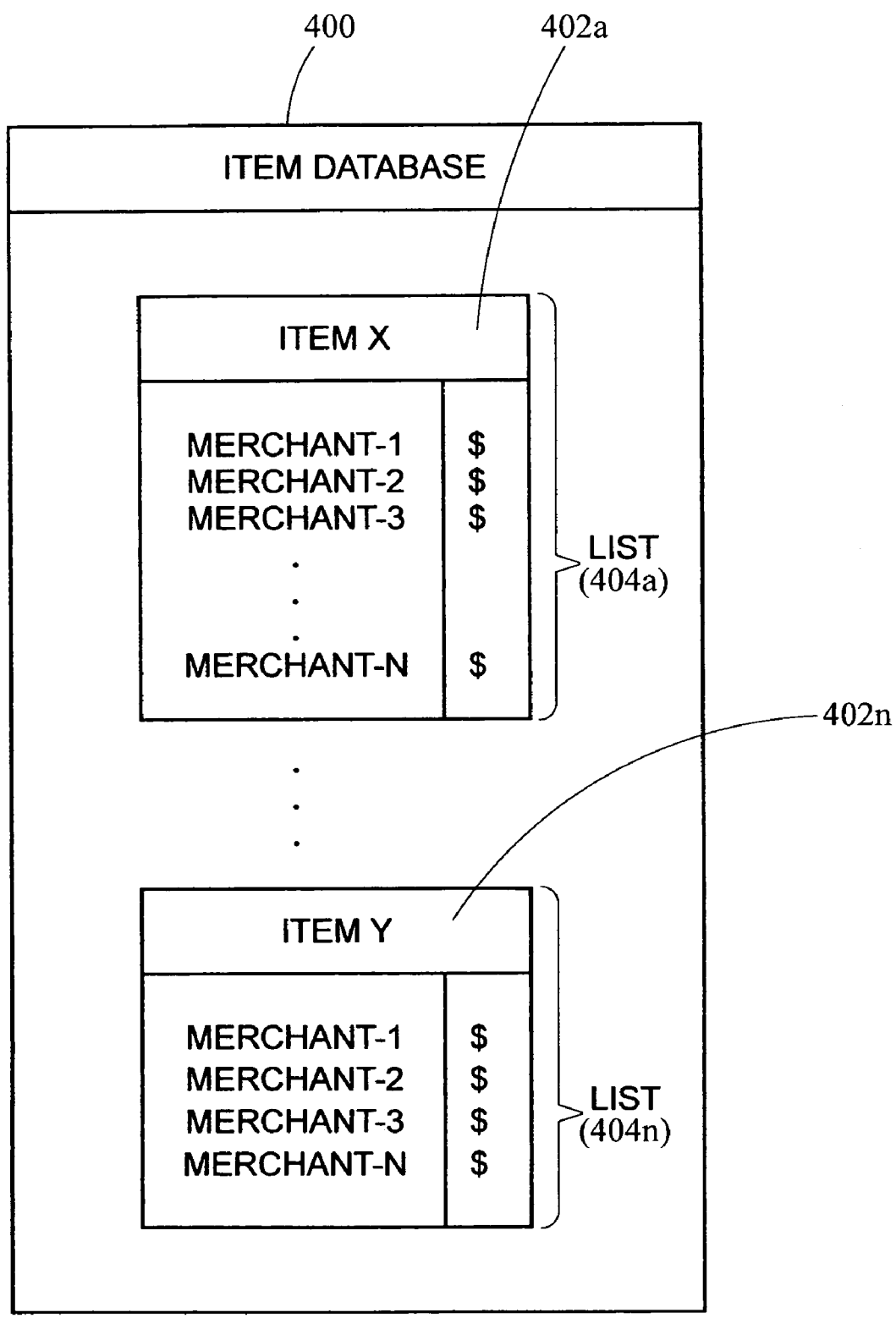
FIG. 4A illustrates an item database, in accordance with one embodiment of the present invention.
Figure 4B:
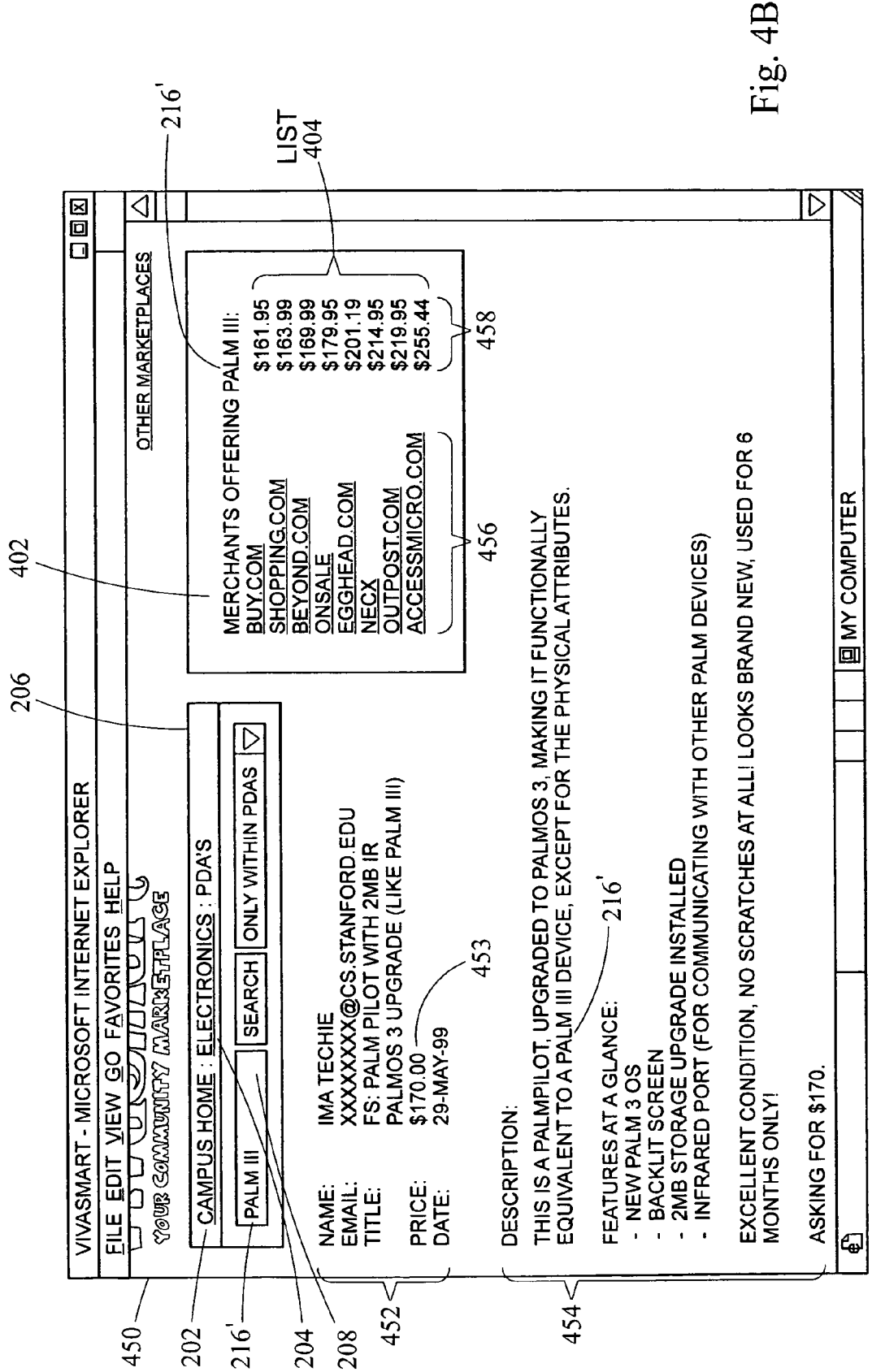
FIG. 4B illustrates a graphical user interface, in which the desired item selected from the classified advertising database is displayed along with the list of merchants offering the particular desired item, in accordance with one embodiment of the present invention.

FIG. 4A illustrates an item database 400, in accordance with one embodiment of the present invention. The item database 400 will include a plurality of lists 404 which include a number of merchants and prices that the merchant is offering for a particular item 402. By way of example, the item database is shown including ITEM X 402a up to ITEM Y 402n. Each item class is associated with a list of merchants and prices, and identifies the selling prices for the item. As mentioned above, each item has the list of merchants and prices, and is preferably generated in advance to enable quick access to the item database. In other embodiments, the item database can be generated while the user is on-line to enable the generation of the most current pricing information.

FIG. 4B illustrates a graphical user interface 450, in which the desired item selected from the classified advertising database is displayed along with the list of merchants offering the particular desired item, in accordance with one embodiment of the present invention. In this example, the user selected to search for "Palm III" by entering Palm III into field 208 for searching, only within the class for PDAs. The user is presented with a brief description 452 of the entity that submitted the advertisement entry in the classified advertising database.

Also provided is a description 454 that describes the desired item in more detail. The item 402 from the item database is presented by displaying item Palm III and a list 404 of merchants 456 and prices 458 for the item 216'. In this example, comparison shopping is facilitated by allowing the user to quickly reference the list of merchants and prices for the same or substantially similar item selected from the classified advertising database. As shown, the used item from the classified advertising sells for $170.00 153, and the list of merchants provides several merchants as options that sell the same item, brand-new for a cost that is less than the used item. Advantageously, the user can then click on a link to the web site providing e-commerce capability for the particular merchant 456, which is listing the item for the lower price. As can be appreciated, the user of the community marketplace will then be able to quickly and intelligently select an item to purchase from both a listing of classified advertising and a listing of merchants from an easy-to-use graphical user interface.

FIG. 4C illustrates an item table 408, which is configured to be generated in real-time over the Internet upon receiving a request for a desired item, in accordance with another embodiment of the present invention. In this embodiment, the item table 480 includes a list 482 of merchants that potentially offer the desired item. In some cases, the desired item is not carried by a particular merchant, and that information is provided in the list 482. In this manner, if a user likes to shop from a particular vendor, that user will not spend extra time on the web searching to see if his or her favorite vendor carries the item.

For those merchants that do carry the desired item, the on-line consumer will be informed of several other important factors that can be considered before the purchase is commenced. For instance, the user is provided with information about availability. In some cases, a particular merchant will be out-of-stock of the desired item and is unaware of when the item will be available. In other cases, the merchant will carry the item, but the item will not be available for 2–3 weeks, 1–2 days, etc. Further, some on-line merchants also sell used items, and therefore, the list 482 is configured to provide that information to enable more accurate comparison shopping.

Although a particular merchant may have the lowest price for a given item, that given item may end up costing more due to additional costs associated with tax and shipping. As such, before the on-line consumer buys the particular item from the merchant in the list 482, the total price will also be considered by the on-line consumer. This powerful array of information places the most relevant buying information in front of an on-line buyer in an easy comparison format, thus relieving the user from doing repetitive individual searches on web sites of each consumer. It is also noted that if the on-line buyer were to do such repetitive searches, the user would not only have to know in advance the names of all of the merchants offering the item, but would also have to spend time on their web sites entering purchase information to find out the total price (i.e., including tax and shipping), availability, and whether the item is new or used.

Figure 5:
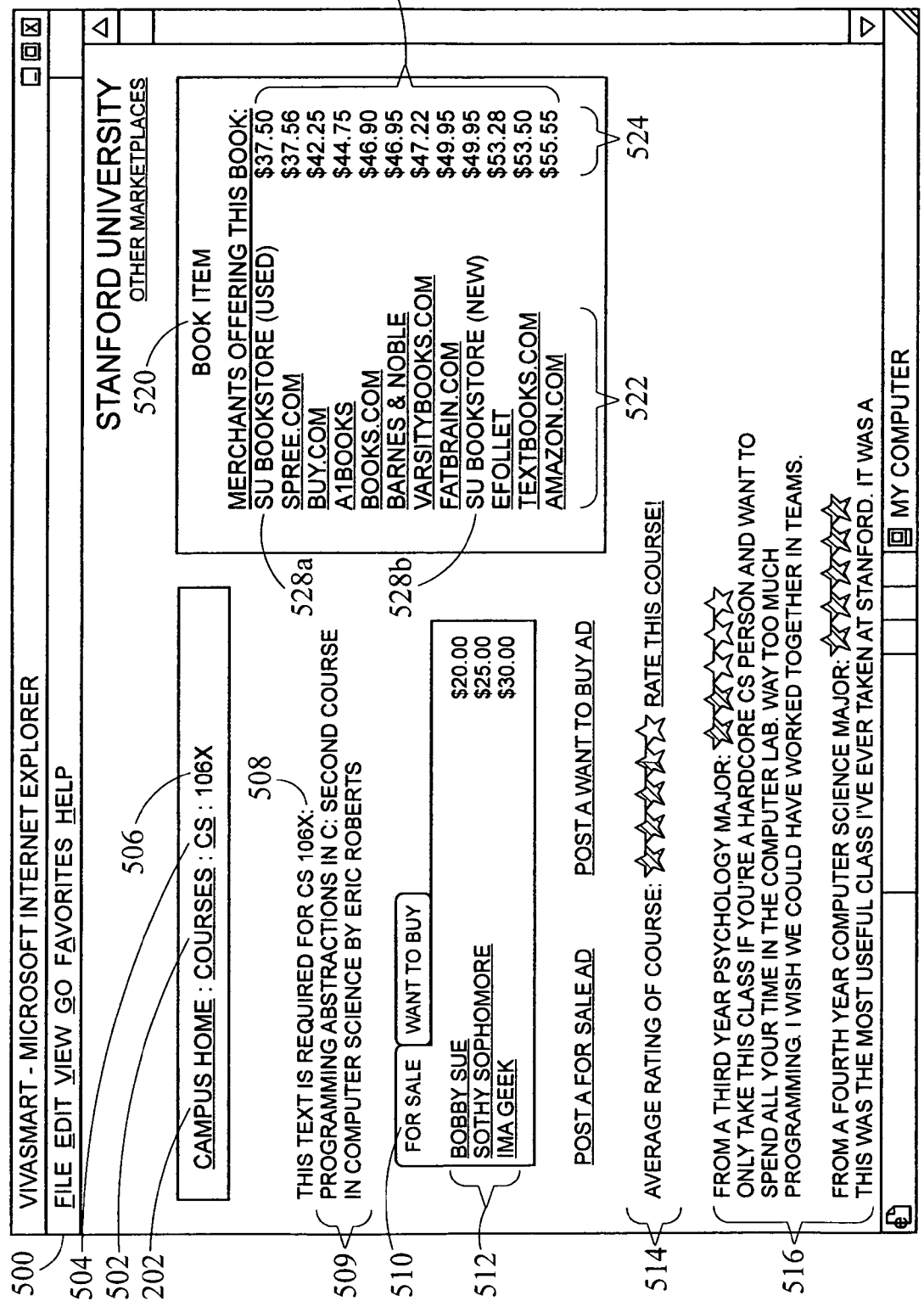
FIG. 5 illustrates a graphical user interface for e-commerce comparison shopping of books, in accordance with another embodiment of the present invention.

FIG. 5 illustrates a graphical user interface 500, in accordance with another embodiment of the present invention. In this embodiment, the community marketplace user may be a student from Stanford University. As is well known, university students are required to purchase a number of books that will be used in conjunction with selected classes. A member of this community marketplace can then select from the campus homepage 202 a listing of courses 502. Once courses 502 is selected, the user can select classes in computer science (CS) 504. Once that selection is made, the user can select course 106X 506. This selection will then present to the user information regarding the particular course and book(s) that is required for the course.

In this example, a textbook entitled "Programming Abstractions in C: Second Course in Computer Science," by Eric Roberts 509 is required for course 106X 506. As shown, the user is provided with a listing of classified advertising from within the community. This listing is a classified ad database 512, that includes entities willing to sell the course book 509 for a given price. Presented along with the listing of classified ads from the classified ad database 512 will be a list of merchants for the book item 520. The book item is part of an item database, which identifies merchants 522 and prices 524 for the book item 520. In one embodiment, the book item 520 can be searched for by way of an ISBN identifier. As is well known, most all books are assigned an ISBN identifier, and when an on-line book selling merchant is searched to see if they carry the book, the ISBN identifier can be used to quickly reference the book.

Listed as part of the merchants 522 is the Stanford University bookstore, which sells book item 520 in used condition for $37.50. The Stanford University bookstore is also shown at 528b as listing the book item 520 for $49.95 in new condition. However, if the user of the community marketplace desires to purchase the book in new condition, the user can purchase that same book by way of one of a non-school merchant which offer the book by way of e-commerce. In this example, Spree.com is listing the book for $37.56 in new condition. As can be appreciated, a user of this community marketplace comparison shopping engine will be quickly able to purchase the book in new condition for about the same price as the Stanford University bookstore sells the book in used condition.

Also shown by way of this display is additional information to assist the user of the community marketplace in deciding whether to take a particular course of study. In this example, the web page offers a rating of the course 514 and also provides additional ratings and commentary 516 to assist the student in determining whether to take the course and buy the book item 520.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating comparison shopping data, comprising:
   generating a database of classified advertising, the database of classified advertising having a plurality of classified advertisements;
   generating a database of items, each item having a list of merchants and prices, and each merchant has an associated price for the item;
   providing a list of one or more classified advertisements from the plurality of classified advertisements;
   receiving a selection of a classified advertisement from the list of one or more classified advertisements;
   determining, by a computer, a description of a desired item based on information in the selected classified advertisement, the description describing the desired item and comprising information in the selected classified advertisement;
   running the description of the desired item comprising information in the classified advertisement through a classification rule base to determine an item type;
   determining a list of merchants and prices in the database of items for the determined item type; and
   displaying the desired item along with the determined list of merchants and prices, the determined list of merchants and prices being part of the database of items and being associated with the item type from the database of items being associated with the item type from the database of items.

2. A method for generating comparison shopping data as recited in claim 1, wherein the generating of the database of items is performed in real-time over the Internet upon receiving the selection for the desired item from the database of classified advertising.

3. A method for generating comparison shopping data as recited in claim 1, wherein each item that has a list of merchants and prices further includes:
   availability information for the item from each merchant;
   additional costs information other than the prices for the item from each merchant; and
   total costs for the item, the total cost including the price and the additional costs other than the prices.

4. A method for generating comparison shopping data as recited in claim 1, wherein the received selection for a desired item from the database of classified advertising further comprises:
   searching for the desired item to facilitate in the selection of the desired item, the searching is performed by way of a keyword search or a browsing search.

5. A method for generating comparison shopping data as recited in claim 4, wherein when the searching for the desired item is complete, a selection of the desired item causes the receiving of the request for a desired item.

6. A method for generating comparison shopping data as recited in claim 1, wherein each entry in the database of classified advertising includes a type field, a title of item field, a name of seller field, a posting date field, and a sale price field.

7. A method for generating comparison shopping data as recited in claim 1, wherein each merchant in the list of merchants includes a link to an ecommerce web site of the merchant for obtaining the item at the associated prices.

8. A method for generating comparison shopping data as recited in claim 1, wherein the displaying of the desired item along with the particular list of merchants and prices further comprises:
   displaying a full text description of classified advertising data for the requested item and the particular list of merchants and prices for comparison shopping.

9. A method for generating comparison shopping data as recited in claim 1, wherein the generated comparison shopping data is ecommerce based data.

10. A method for generating comparison shopping data, comprising:
    providing a list of one or more classified advertisements from a plurality of classified advertisements in the database of classified advertisements;
    receiving a selection of a classified advertisement from the list of one or more classified advertisements;
    determining, by a computer, a description of a desired item based on information in the selected classified advertisement, the description describing the desired item and comprising information in the selected classified advertisement;
    running the description of the desired item comprising information in the classified advertisement through a classification rule base to determine an item type;
    generating an item table for the determined item type, the item table being assembled from currently available on-line data; and
    displaying the desired item along with the generated item table.

11. A method for generating comparison shopping data as recited in claim 10, wherein the item table includes price information, availability information, type information, additional cost information other than price information, and total cost information.

12. A method for generating comparison shopping data as recited in claim 10, wherein each entry in the database of classified advertising includes a type field, a title of item field, a name of seller field, a posting date field, and a sale price field.

13. A method for generating comparison shopping data as recited in claim 10, wherein the item table includes a list of merchants and associated price for each merchant, wherein each merchant in the list of merchants includes a link to an ecommerce web site of the merchant for obtaining the item at the associated prices.

14. A method for generating comparison shopping data as recited in claim 10, wherein the displaying of the desired item along with the generated item table further comprises:
    displaying a full text description of classified advertising data for the requested item and the item table for comparison shopping.

15. A method for generating comparison shopping data, comprising:
    providing a list of one or more classified advertisements from a plurality of classified advertisements in the database of classified advertisements;
    receiving a selection of a classified advertisement from the list of one or more classified advertisements;
    determining, by a computer, a description of a desired item based on information in the selected classified advertisement, the description describing the desired item and comprising information in the selected classified advertisement;
    running the description of the desired item comprising information in the classified advertisement through a classification rule base to determine an item type;

generating an item table for the determined item type, the item table being assembled from currently available on-line data that includes ecommerce purchasing information; and displaying the desired item along with the generated item table, the displaying being configured to inform an on-line buyer of purchasing alternatives for the requested item.

16. A method for generating comparison shopping data as recited in claim 15, wherein the item table includes merchant information, price information, availability information, new and used information, tax and shipping information, and total cost information.

17. A method for generating comparison shopping data as recited in claim 15, wherein the generated item table is assembled in response to the determination of the item type.

18. A computer readable media having program instructions for generating web-based comparison shopping data, the computer readable media comprising:

programming instructions for generating a database of classified advertising, the database of classified advertising having a plurality of classified advertisements;

programming instructions for generating a database of items, each item having a list of merchants and prices, and each merchant has an associated price for the item;

programming instructions for providing a list of one or more classified advertisements from the plurality of classified advertisements;

programming instructions for receiving a selection of a classified advertisement from the list of one or more classified advertisements;

programming instructions for determining a description of a desired item based on information in the selected classified advertisement, the description describing the desired item and comprising information in the selected classified advertisement;

programming instructions for running the description of the desired item comprising information in the classified advertisement through a classification rule base to determine an item type;

programming instructions for searching for the item type in the database of items, the searching performed by way of a keyword search or a browsing search; and programming instructions for displaying the desired item along with a particular list of merchants and prices, the particular list of merchants and prices being part of the database of items and being associated with the item type from the database of items being associated with the item type from the database of items.

19. A computer readable media having program instructions for generating web-based comparison shopping data as recited in claim 18, wherein the programming instructions for determining the item based on information in the classified advertisement comprises:

programming instructions for searching the database of items to find the class that corresponds to the desired item.

20. A computer readable media having program instructions for generating web-based comparison shopping data as recited in claim 18, wherein each entry in the database of classified advertising includes a type field, a title of item field, a name of seller field, a posting date field, and a sale price field.

21. A computer readable media having program instructions for generating web-based comparison shopping data as recited in claim 20, wherein when the searching for the desired item is complete, a selection of the desired item causes the receiving of the request for a desired item.

22. A computer readable media having program instructions for generating web-based comparison shopping data as recited in claim 18, wherein each merchant in the list of merchants includes a link to an ecommerce web site of the merchant for obtaining the item at the associated prices.

23. A computer readable media having program instructions for generating web-based comparison shopping data as recited in claim 18, wherein the programming instructions for displaying of the requested item from the database of classified advertising along with the generated item table further include:

programming instructions for displaying a full text description of classified advertising data for the requested item and the item table for comparison shopping.

24. A method for generating comparison shopping data, the comparison shopping data being generated from a database of classified advertising having a plurality of classified advertisements and on-line merchant items, each item of the on-line merchant items having a list of merchants and prices, and each merchant has an associated price for the item, the method comprises:

providing a list of one or more classified advertisements from the plurality of classified advertisements;

receiving a selection of a classified advertisement from the list of one or more classified advertisements;

determining, by a computer, a description of a desired item based on information in the selected classified advertisement, the description describing the desired item and comprising information in the selected classified advertisement;

running the description of the desired item comprising information in the classified advertisement through a classification rule base to determine an item type from the on-line merchant items; and displaying the desired item from the database of classified advertising along with the a particular list of merchants and prices, the particular list of merchants and prices being part of the on-line merchant items and being associated with the item type from the on-line merchant items.

25. A method for generating comparison shopping data as recited in claim 24, wherein the on-line merchant items are pre-generated and stored in an item database.

26. A method for generating comparison shopping data as recited in claim 24, wherein the on-line merchant items are generated upon commencing the searching of the on-line merchant items, and the searching is an Internet-based search.

27. A method for generating comparison shopping data, comprising:

generating a database of classified advertising, the database of classified advertising having a plurality of classified advertisements;

generating a database of item classes, each item class having a list of merchants and prices, and each merchant has an associated price for the item, wherein in each item class corresponds to an item found in the plurality of classified advertisements in the database of classified advertising;

providing a list of one or more classified advertisements from the plurality of classified advertisements in the database of classified advertising;

receiving a selection of a classified advertisement from the list of one or more classified advertisements;

determining, by a computer, a description of a desired item based on information in the selected classified advertisement, the description describing the desired item and comprising information in the selected classified advertisement;

running the description of the desired item comprising information in the classified advertisement through a classification rule base to determine an item class;

determining a list of merchants and prices in the database of items for the determined item class; and displaying the desired item along with the determined list of merchants and prices, the determined list of merchants and prices being part of the database of items and being associated with the item type from the database of items being associated with the item type from the database of items.

* * * * *